May 17, 1955

S. W. ALDERSON 2,708,496

LOCKING MEANS FOR PIVOTAL JOINTS

Filed April 21, 1952

INVENTOR
SAMUEL W. ALDERSON
BY
ATTORNEY

May 17, 1955  S. W. ALDERSON  2,708,496
LOCKING MEANS FOR PIVOTAL JOINTS
Filed April 21, 1952

FIRST STROKE

RETURN STROKE

INVENTOR
SAMUEL W. ALDERSON
BY
ATTORNEY

May 17, 1955 S. W. ALDERSON 2,708,496
LOCKING MEANS FOR PIVOTAL JOINTS
Filed April 21, 1952 3 Sheets-Sheet 3

2ND. STROKE

2ND STROKE OPERATING LEVER RESTORATION

ORIGINAL POSITION

INVENTOR
SAMUEL W. ALDERSON
BY
ATTORNEY 2,708,496

LOCKING MEANS FOR PIVOTAL JOINTS

Samuel Weir Alderson, Westport, Conn.

Application April 21, 1952, Serial No. 283,460

9 Claims. (Cl. 192—92)

This invention relates to locking means employed at a pivotal point in an articulated mechanical device.

The object of the invention is to provide means in a prosthetic device consisting of two pivoted sections of an artificial limb whereby relative movement of the said sections may be inhibited at will by a control effort on the part of an amputee, much less in intensity than the force needed to hold the two parts firmly against such relative movement.

The invention consists primarily of a multiple disc clutch incorporated in the joint of an artificial limb, a bearing plate for causing the engagement of the discs thereof, a system of force multiplying levers, a solenoid for actuating said system of levers, a source of current for operating the said solenoid and a switch controlled in one or another way by the amputee for applying said source of current to said solenoid. The system of levers is so arranged that one operation of the switch will lock the device and a second or succeeding operation of the switch will unlock it. These movements may follow one another in quick succession so that the amputee may have complete and rapid control of the artificial limb without undue effort on his part. In more particularity, a latch is provided whereby as a result of a first control effort, the system of levers will cause the firm engagement of the clutch and then lock it into mechanical engagement and whereby a second or succeeding control effort will unlatch the arrangement and release the clutch.

The invention is characterized by the use of an actuating member given a movement of translation by a powerful solenoid and provided with an engagement hook for operating the system of levers to move the discs of the clutch together and a disengagement hook for moving the latch away from the main lever. There is also provided a cam roller on this actuating member placed to be in cooperative relationship with a cam on the said main lever to render one or the other of said hooks effective. In essence, the actuating member is normally held in such position that the engagement hook is poised to operate the system of levers. When the solenoid is operated, then, the system of levers is operated, the clutch discs are brought firmly together and the latch snaps into place to secure the main lever in its operated position. When the solenoid is released the actuating member moves backward toward its original position and at the same time revolved to poise the disengagement hook into cooperative relationship with a catch on the latch. At any time thereafter, when the solenoid is again operated the latch will be moved to release the system of levers which then return by spring force to their normal positions. When the solenoid is again released the actuating member moves backward toward its normal position. However, a cam roller thereon comes into engagement with a cam on the main lever and the actuating member is rotated back to its original position where the engagement hook becomes again poised to operate the system of levers.

A feature of the invention is a striker-release arm rotatably mounted on a shaft, which may be given a movement of translation. This arm is provided with a hook face at each end and controlled to poise each hook alternately before a locking means and an unlocking means whereby as the said shaft is reciprocated the device will be alternately locked and unlocked. In accordance with this feature the striker-release arm on its first stroke engages and operated a lever system to operate a main operating lever which is then latched. The main operating lever forces the discs of a multiple disc clutch together so that relative movement between two parts of an articulated limb is inhibited or restrained. The striker-release arm on its return stroke is freed to rotate and by so rotating it then poises the hook face at its other end before a stud on the latch by which the main operating lever is held in its operated position. Upon the next stroke of the shaft on which the striker-release arm is mounted, the rear hook face engages the said latch and frees the main operating lever so that pressure on the discs of the clutch is released. The main operating lever, returning to its initial position interposes a camming surface in the path of a stud on the striker-release arm so that on the return stroke thereof it will be rotated back to its initial position where its forward hook face is poised before the operating means.

Another feature of the invention is a resilient camming means. The cam used to rotate the striker-release arm is slidably mounted on the main operating lever so that as the forward hook face is being poised it may ride over a cooperating stud and then move slightly forward so as to be effectively latched in its operating position. The arm is under the constant strain of a spring acting to rotate it into cooperative relationship with the operating lever latch. Consequently the forward hook face has a contour fashioned to maintain it in effective cooperative relationship with the main operating lever system and against the force of this rotating spring. Consequently the camming face must give slightly as the striker-release arm is rotated to its initial position.

Another feature of the invention is the use of a solenoid for reciprocating the striker-release arm. This movement may be executed by any conventional means such as a mechanical lever operated by an amputee's body movement, a pneumatic pump element or otherwise. However, a very compact, efficient and reliable arrangement is afforded by the use of a solenoid, the control of which by a body movement of an amputee requires a very small effort. Certain power driven prosthetic devices are operated by a small storage battery carried by an amputee and the solenoid of the present invention may be operated therefrom. The control may be operated by some muscular movement or even by a stump movement by which a main switch may be momentarily closed.

Another feature of the invention is a self protecting circuit arrangement whereby the drain on the battery may be minimized. It will be abundantly clear that the size of the power source will be limited and means must be employed to protect such a source against overload. Since it is common knowledge that it takes only a fraction of the power to maintain an electromagnetic device operated after the air gap has been closed that it takes to start the operation when the air gap is fully open, applicant has provided a means to cut automatically a resistance in circuit just prior to the attainment of full operation of the solenoid. This, in one form of the invention, takes the form of a normally short-circuited resistance which will reduce the ampere turn energization of the solenoid from that necessary to start the movement of the armature thereof to that necessary to maintain the armature in fully operated position. This resistance element is short-circuited by the contacts of a conventional micro-switch which in turn is responsive to the movement of the armature of the solenoid, this switch being adjusted and arranged to operate from a normally closed position immediately prior to the end of the stroke of the armature. Thus the full current strength is maintained for only a fraction of a second, the battery is protected from undue drain and the solenoid is protected from overheating.

Other features will appear hereinafter.

The drawings consist of three sheets having nine figures, as follows.

The device of the present invention has been specifically designed as an elbow lock for a prosthetic device and is to be secured in the upper arm section of an artificial arm to control the pivoted forearm section thereof, but is of wide application and may be employed in any situation where a pivoted joint needs to be controlled, at times locked against movement and at other times rendered free to move. Essentially the device consists of a frame in which a multiple disc clutch is mounted to control the movement of another limb section pivoted on the axis of the said clutch.

Figure 1:
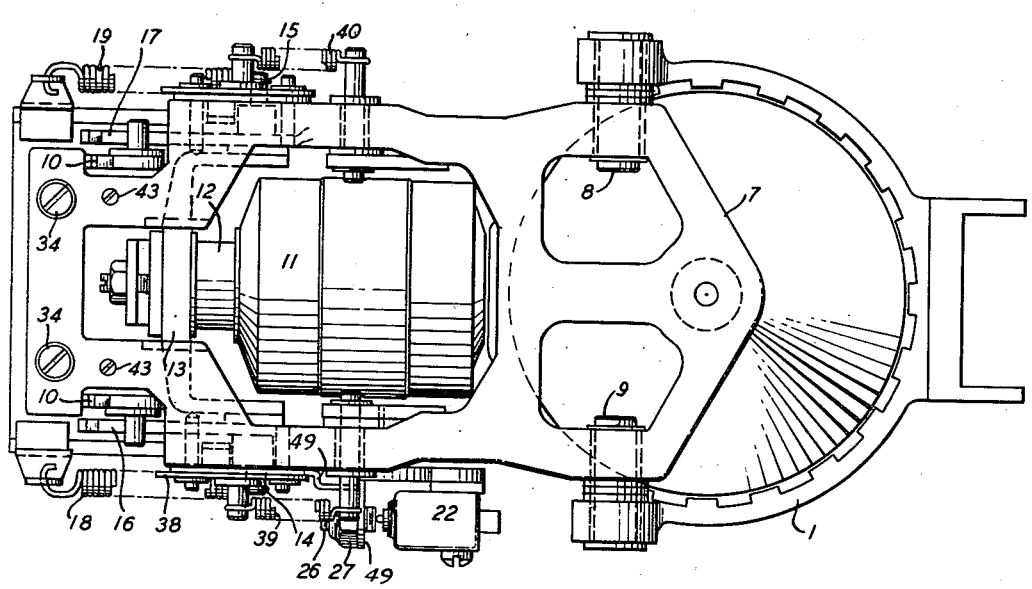
Fig. 1 is a plan view of the elbow locking mechanism of the present invention.
Figure 2:
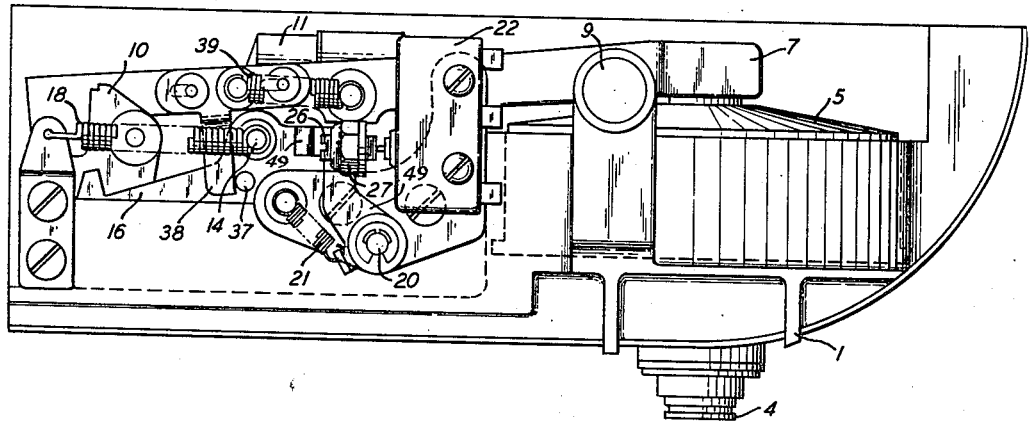
Fig. 2 is a side view of the same.

The frame 1 is a casting, machined for mounting the various parts of the device and adapted to be secured to one part such as the upper arm section of an artificial limb. The right hand end of this frame as pictured in Figs. 1, 2, 4 and 5 holds a multiple disc clutch consisting of friction discs 2 held against rotation by splines shown clearly in Fig. 1, cooperating friction discs 3, secured by splines to a rotatable member 4 mounted on the axis of the device and which may be secured to the other part such as the forearm section of an artificial limb. A pressure bearing plate 5 is provided by which the discs of the clutch may be pressed together to render the part 4 immovable with respect to the frame 1. A spring 6 normally holds the bearing plate 5 out of engagement with the discs of the clutch to render the part 4 free to rotate with respect to the frame 1.

The device is operated by an operating lever 7 pivoted to the frame 1 by the shafts 8 and 9 journaled in the frame 1 and the lever 7 and when driven to its fully operated position may be secured in its operated position by a latch 10. The means for operating the device consists of a solenoid 11, constructed and arranged to move a core member 12 into the solenoid. A yoke 13, partially shown in Fig. 1, consisting of a U-shaped member having two studs 14 and 15 may be given a movement of translation along the axis of the solenoid. The studs 14 and 15 extend from the two ends of the yoke 13 through slots provided in the frame 1 and indicated by dotted lines in Figs. 5, 6, 7, 8 and 9. There is a striker-release arm 16 rotatably mounted on the stud 14 (and a similar arm 17 mounted on the stud 15) which, by a first strike, will lock the device and by a second stroke will unlock or release the device. The yoke 13 and the striker-release arms 16 and 17 are normally held in their extreme left hand positions by springs 18 and 19 attached at one end to the frame 1 and at their other ends to the studs 14 and 15 respectively.

Figure 3:
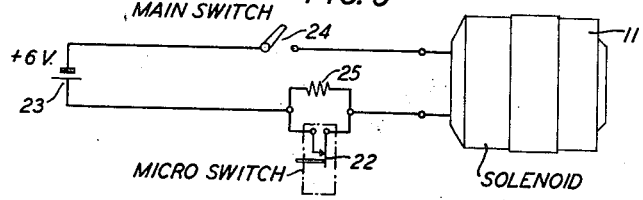
Fig. 3 is a schematic circuit diagram, showing how the device may be operated electrically.

There is a micro-switch operating arm 49 pivoted to the frame by the shaft 20 and normally forced by the spring 21 against the button of the micro-switch 22, though with insufficient force to operate the said micro-switch. When the solenoid is operated and the stud 14 is moved toward the right the micro-switch operating arm will be rotated in a clockwise direction and near the end of the stroke will cause the micro-switch 22 to be operated. This is for the purpose shown by the wiring diagram, Fig. 3. It is known that the force with which a solenoid will attract an armature increases very greatly as the air gap is shortened and that therefore it requires only a very small energization to maintain the armature attracted as against the energization required to start the movement. In the electrically power driven prosthetic devices, the amputee carries a small storage battery 23, necessarily of limited power. By some conventional control switch 24 the amputee may at will close the circuit from the battery 23 to the solenoid 11. There is a resistor 25 included in the circuit, but this is normally short-circuited by the (normally closed) micro-switch 22 so that when the amputee operates the switch 24 the solenoid will receive the full power from the battery 23. However, near the end of the stroke the microswitch will be operated and the resistor 25 will be introduced into the circuit, thus protecting the battery from undue drain. By means of an adjusting screw 26 and lock nut 27 the micro-switch may be arranged to operate just at the end of the stroke.

Figure 6:
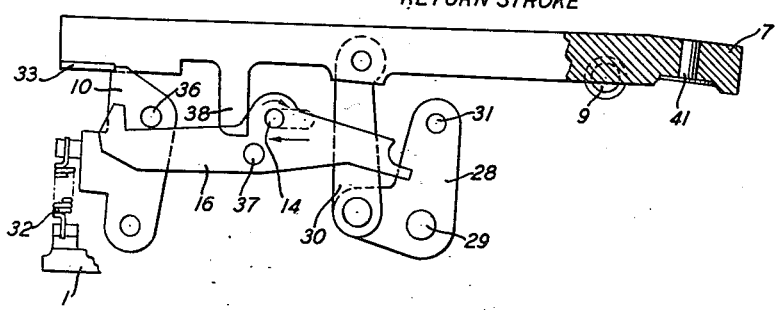
Fig. 6 is a like view showing the position of the parts at the end of the return stroke after the first operation depicted in Fig. 5.
Figure 7:
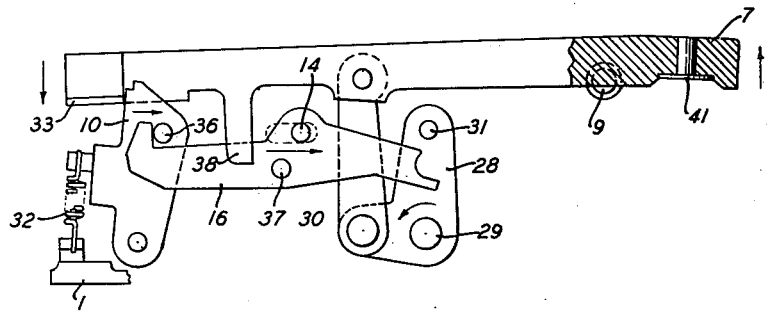
Fig. 7 is a like view showing the position of the parts at the end of the second stroke or energization of the solenoid for the release of the mechanism.
Figure 8:
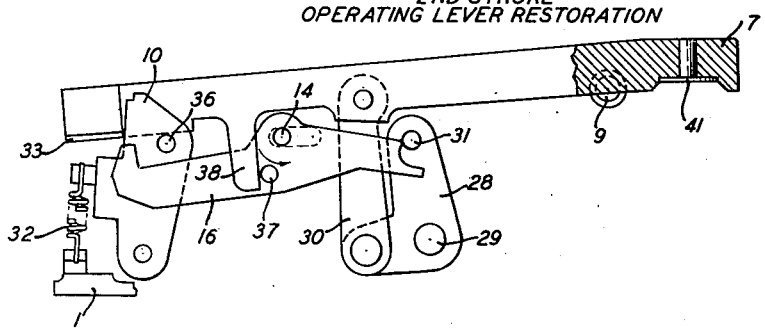
Fig. 8 is a like view showing the position of the parts near the end of the second return stroke or deenergization of the solenoid.

For mechanically moving the operating lever 7, there is a bell crank 28 pivoted to the frame 1 by the shaft 29, and acting to move the link 30 pivoted at one end to the operating lever 7 and at the other end thereof to the bell crank 28. There is a stud 31 mounted on the far end of the bell crank 28 which may be engaged by a hook at the right hand extremity of the striker-release arm 16. As the solenoid is energized this stud 31 is engaged and the bell crank is rotated in a clockwise direction, the link 30 is moved upwardly and the operating lever is rotated in a clockwise direction against the force of the spring 6 to bring the driving and driven discs of the clutch together. Near the end of the stroke the latch 10, under the force of the spring 32, will engage the part 33 of the operating lever 7. For practical adjustment the thickness of the part 33 at either side may be changed by introducing shims between the body of the lever 7 and the part 33 secured thereto by the screw 34. When the operating lever is latched the amputee may relax the control to open the switch 24, whereupon the yoke 13 and the studs 14 and 15 will be moved to the left. As the hooked end of the striker-release arm 16 is disengaged from the stud 31, the arm 16, under the influence of a spring 35 will rotate in a clockwise direction, as indicated in Fig. 6 so that a hook on the left hand extremity of the arm 16 will come into cooperative relationship with a stud 36 mounted on the latch 10. By the same token the hook on the right hand extremity of the striker-release arm is moved to a position where on the next stroke it will fail to engage the stud 31.

When the amputee wishes to free his artificial forearm, he again operates the switch 24 and a second stroke is executed. The left hand hook of the striker-release arm 16 engages the stud 36 and unlatches the operating lever 7 which thereupon returns to its normal position under influence of the spring 6.

Figure 4:
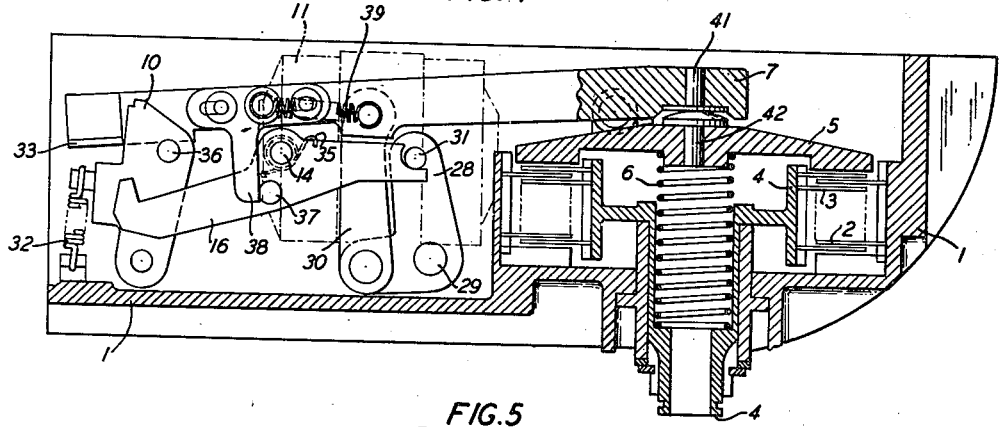
Fig. 4 is a schematic view, partly in section of the essential elements in their normal unoperated positions.
Figure 5:
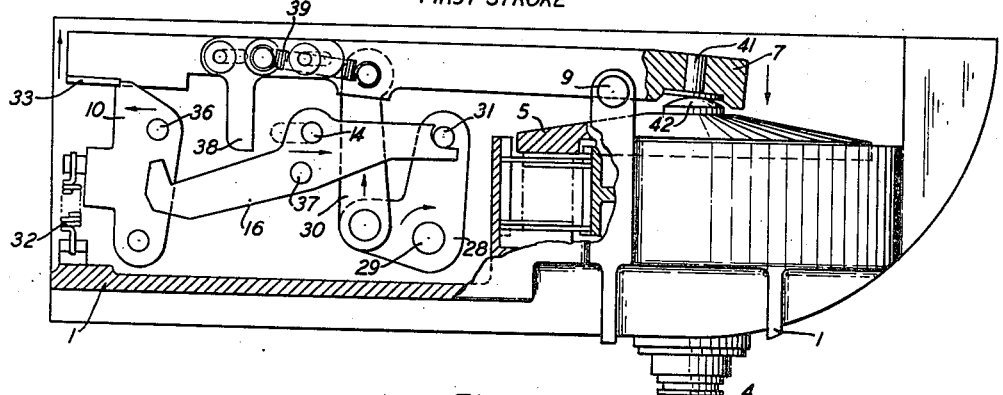
Fig. 5 is a like view showing the position of the parts at the end of the first stroke or energization of the solenoid.
Figure 9:
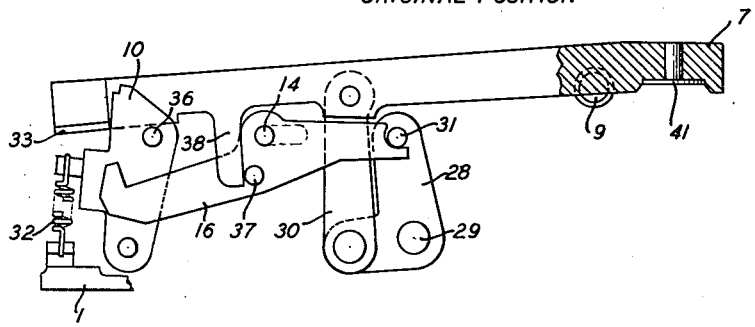
Fig. 9 is a like view showing the complete restoration of the parts to the original position depicted in Fig. 4.

As the return stroke is executed after the amputee again opens the switch 24, a stud 37 mounted on the striker-release arm 16 is engaged by a cam 38, whereby the arm 16 is rotated in a counterclockwise direction to its normal position shown in Figs. 4 and 9.

In order to allow the hook at the right hand extremity of the striker-release arm 16 to engage the stud 31 properly, the cam 38, as shown in Figs. 1, 2, 4 and 5, is mounted as a separate piece part on the operating lever 7 in such a way that it will slide a short distance toward the left and when the arm 16 has moved to its extreme counterclockwise position will be restored by the springs 39 and 40.

Again, for practical adjustment, the multiple disc clutch may be adjusted by shims under either or both of the buttons 41 and 42 and by movements of adjusting screws 43, bearing against the frame 1.

What is claimed is:

1. The combination of a multiple disc clutch, a clutch bearing plate for bringing the driving and the driven discs of said clutch into cooperative relationship with each other, an operating lever for pressing said clutch bearing plate against said discs, a latch for locking said operating lever into its fully operated position, a striker-release arm, means for reciprocating said arm, a lever system for moving said operating lever from its released position to its said fully operated position, means for poising said striker-release arm in cooperative relationship with said lever system to operate said operating lever on the first forward stroke of said arm, and means for thereafter poising said striker-release arm in co-operative relationship with said latch to disengage said latch from said operating lever on the second forward stroke of said arm.

2. The combination of a multiple disc clutch, a clutch bearing plate for bringing the driving and the driven discs of said clutch into cooperative relationship with each other, an operating lever for pressing said clutch bearing plate against said discs, a latch for locking said operating lever into its fully operated position, a striker-release arm, motor means for giving said arm a movement of translation, a spring for giving said arm a movement of rotation, a cam mounted on said operating lever for rotating said arm in a direction opposed to the movement caused by said spring, a lever system for moving said operating arm into its said fully operated position, means including said cam for poising said striker-release arm before said lever system, whereby a succeeding stroke of said arm will move said operating lever into its said fully operated and latched position, and means including said spring for poising said striker-release arm before said latch, whereby a next succeeding stroke of said arm will disengage said latch from said operating lever and a clutch spring for returning said operating lever to its normal unoperated position.

3. The combination of a pivot lock for an articulated joint, an operating lever for securing said lock in its operated position and for freeing said lock in its released position, a latch for locking said operating lever in its operated position, a striker-release arm, means for reciprocating said arm, means for rotating said arm, a lever system for moving said operating lever, said arm in one rotational position thereof being poised before said lever system for the operation thereof on the next stroke of said arm, said arm in another rotational position thereof being poised before said latch for the disengagement thereof from said operating lever on the next stroke of said arm.

4. The combination of a pivot lock for an articulated joint, an operating lever for securing said lock in its operated position and for freeing said lock in its released position, a latch for locking said operating lever in its operated position, a striker-release arm, means for reciprocating said arm, means for rotating said arm, a lever system for moving said operating lever, a stud mounted on the end of said lever system, a stud mounted on said latch, and formations constituting hooks on said arm, one in cooperative relationship with said lever system stud in one rotational position of said arm and the other in cooperative relationship with said latch stud in another rotational position of said arm.

5. The combination of a pivot lock for an articulated joint, an operating lever for securing said lock in its operated position and for freeing said lock in its released position, a latch for locking said operating lever in its operated position, a striker-release arm, means for reciprocating said arm, means for rotating said arm, a lever system for moving said operating lever, a stud mounted on the end of said lever system, a stud mounted on said latch, and formations constituting hooks on said arm one in cooperative relationship with said lever system stud in one rotational position of said arm and the other in cooperative relationship with said latch stud in another rotational position of said arm, said means for rotating said arm, including a spring for rotating said arm in one direction in the operated position of said operating lever and a cam mounted on said operating lever for rotating said arm in the other direction in the released position of said operating lever.

6. The combination of a pivot lock for an articulated joint, an operating lever for securing said lock in its operated position and for freeing said lock in its released position, a latch for locking said operating lever in its operated position, a striker-release arm, a source of battery and a solenoid energized therefrom for reciprocating said arm, mechanical means for rotating said arm, a lever system for moving said operating lever, a stud mounted on said lever system, a stud mounted on said latch, formations constituting hooks on said arm one in cooperative relationship with said lever system stud in one rotational position of said arm and the other in cooperative relationship with said latch stud in another rotational position of said arm and a control switch for interconnecting said battery and said solenoid.

7. The combination of a pivot lock for an articulated joint, an operating lever for securing said lock in its operated position and for freeing said lock in its released position, a latch for locking said operating lever in its operated position, a striker-release arm, a source of battery and a solenoid energized therefrom for reciprocating said arm, mechanical means for rotating said arm, a lever system for moving said operating lever, a stud mounted on said lever system, a stud mounted on said latch, formations constituting hooks on said arm one in cooperative relationship with said lever system stud in one rotational position of said arm and the other in cooperative relationship with said latch stud in another rotational position of said arm, a control switch for interconnecting said battery and said solenoid and means for automatically reducing the solenoid energizing current near the end of the stroke thereof.

8. The combination of a pivot lock for an articulated joint, an operating lever for securing said lock in its operated position and for freeing said lock in its released position, a latch for locking said operating lever in its operated position, a striker-release arm, a source of battery and a solenoid energized therefrom for reciprocating said arm, mechanical means for rotating said arm, a lever system for moving said operating lever, a stud mounted on said lever system, a stud mounted on said latch, formations constituting hooks on said arm one in cooperative relationship with said lever system stud in one rotational position of said arm and the other in cooperative relationship with said latch stud in another rotational position of said arm, a control switch for interconnecting said battery and said solenoid, a normally short-circuited resistance element in series with said solenoid and a micro-switch adapted to be operated at the end of each stroke of said arm, said micro-switch having contacts normally closed to short-circuit said resistance element.

9. The combination of a pivot lock for an articulated joint, an operating lever for securing said lock in its operated position and for freeing said lock in its released position, a latch for locking said operating lever in its operated position, a striker-release arm, means for reciprocating said arm, means for rotating said arm, a lever system for moving said operating lever, a stud mounted on the end of said lever system, a stud mounted on said latch, and formations constituting hooks on said arm one in cooperative relationship with said lever system stud in one rotational position of said arm and the other in cooperative relationship with said latch stud in another rotational position of said arm, a cam slidably mounted on said operating lever for rotating said arm to said position in which one of said hooks is poised in cooperative relationship with said lever system stud, and a spring for holding said cam in cooperative relationship with said arm to allow said hook to ride over and engage said lever system stud.

References Cited in the file of this patent

UNITED STATES PATENTS

| | | |
|---|---|---|
| 1,437,319 | Landis | Nov. 28, 1922 |
| 2,034,335 | Fisher | Mar. 17, 1936 |
| 2,051,752 | Slocum | Aug. 18, 1936 |
| 2,397,414 | Fast | Mar. 26, 1946 |
| 2,428,632 | Mollenhour | Oct. 7, 1947 |
| 2,509,271 | Jeffery | May 30, 1950 |
| 2,554,563 | Dath | May 29, 1951 |

FOREIGN PATENTS

| | | |
|---|---|---|
| 109,151 | Great Britain | Sept. 6, 1917 |